Aug. 16, 1927.

A. H. PITNEY 1,639,384

MULTIPLE DIE FOR POSTAGE METER MACHINES

Filed June 19, 1923    3 Sheets-Sheet 2

Aug. 16, 1927.
A. H. PITNEY
1,639,384
MULTIPLE DIE FOR POSTAGE METER MACHINES
Filed June 19, 1923      3 Sheets-Sheet 3
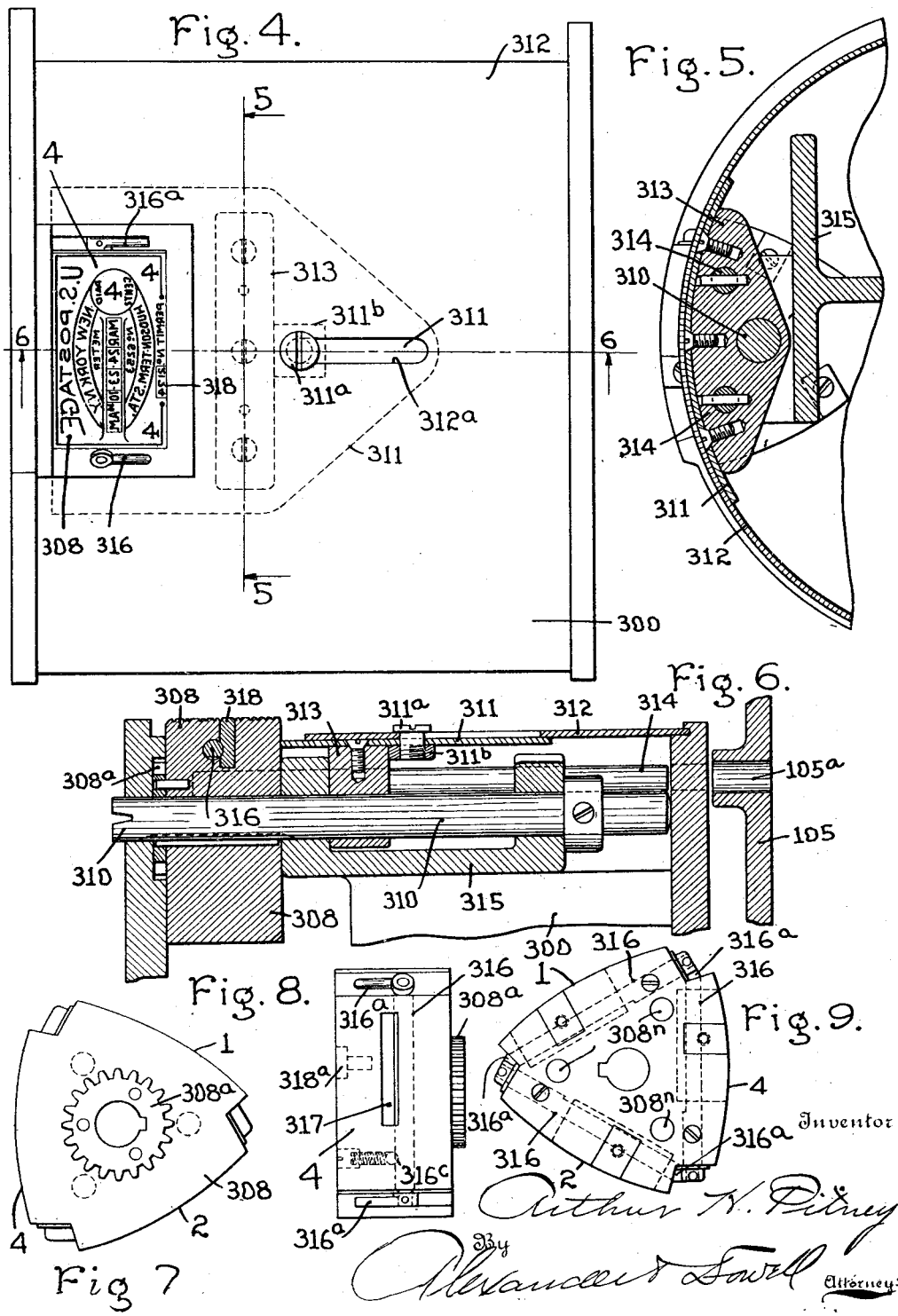

Patented Aug. 16, 1927.

1,639,384

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

MULTIPLE DIE FOR POSTAGE METER MACHINES.

Application filed June 19, 1923. Serial No. 646,443.

This invention is a novel improvement in "postage meter" machines of the type shown in my Patent #1,370,668, dated March 8, 1920, and in particular upon the postage meter shown in my application for patent, Serial No. 647,143, filed June 22, 1923.

In the latter application I have shown a simple novel portable postage meter machine which will enable the user to buy any desired amount of prepaid postage from the Government and print such postage from time to time on his mail in various quantities and amounts as desired, until the total amount of postage for which he has paid is exhausted; whereupon the printing and registering mechanisms will automatically be locked so that no more postmark stamps can be printed until the machine or meter is reset. For this purpose the meter, or the entire printing mechanism, and meter, may be bodily detached from the sealing mechanism and taken as a whole to the post office for re-setting, substantially as described in my aforesaid patent and application. The meter or printing mechanism and meter can be replaced and further sealing and printing operations can be performed until the amount of postage paid for is again exhausted.

The principal object of the present invention is to provide a multiple-faced die which can be used in the aforesaid machines or in other postage meter machines; and to further provide means whereby any one of the faces of such die can be operatively positioned in the meter to imprint a stamp of corresponding denomination or value on the letter; and further to provide means in such meter whereby the amount of the denomination of any stamp imprinted by such die will be simultaneously and automatically registered in the meter.

To enable others to adopt and use the invention I will explain it with reference to the accompanying drawings which illustrate one practical embodiment thereof, and thereafter set forth in the claims the essentials of the invention and the novel features of construction and novel combinations of parts for all of which protection is desired.

In said drawings:

Fig. 4 is a side view of the multiple faced die meter.

Fig. 5 is a detail section thereof on the line 5—5, Fig. 4.

Fig. 6 is a detail section on the line 6—6, Fig. 4.

Fig. 7 is an end view of the multiple faced die.

Fig. 8 is a side view of such die.

Fig. 9 is an opposite end view of such die.

Figure 1:
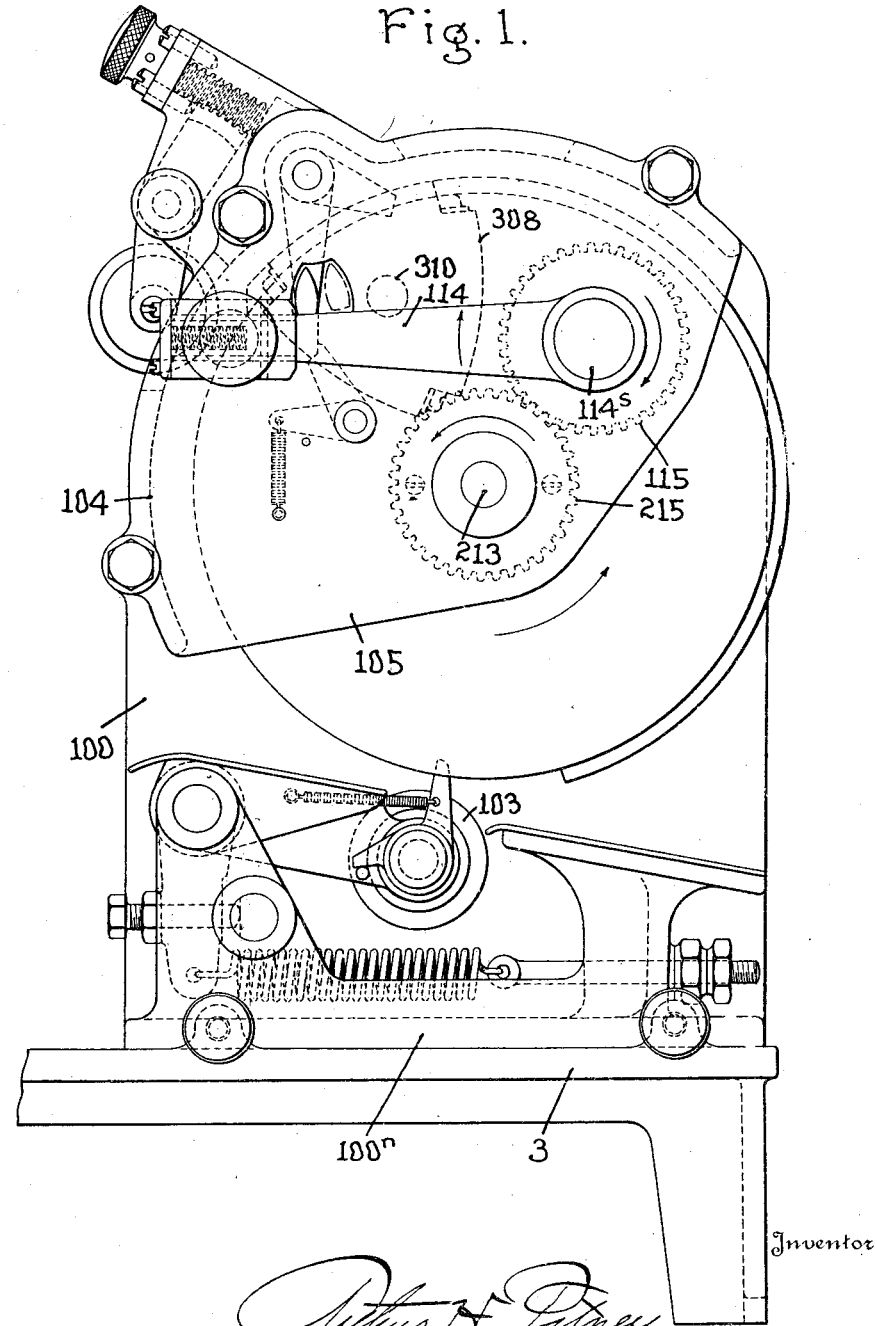
Fig. 1 is a front side elevation of the printing mechanism of the machine shown in my aforesaid application, with the novel multiple die and registering mechanism therein.

The complete machine shown in my aforesaid application includes means for opening and moistening the flap of a letter and sealing same, and means for printing a prepaid postage stamp thereupon and simultaneously registering the amount of stamps so printed. The postmark stamp printing and registering mechanism, as shown in my aforesaid application can be handled as a unit, and as indicated in Fig. 1, it is mounted on a suitable frame comprising a base plate $100^a$, which is detachably attached to the base or support 3. From the rear side of this plate $100^a$ rises a standard 100 to the upper side of which is attached one end of a parti-cylindric hood or shell 104 to the outer end of which is attached a front plate 105.

A spindle 213 is supported at one end in the plate 105, and its other end is supported in a plate 214 (Fig. 2) attached to the inside of the plate 100 by screws $214^a$; said shaft 213 having a head $213^a$ engaging a recess in the plate 214 and fastened or keyed to said plate so that the spindle 213 cannot rotate.

Upon spindle 213 is rotatably mounted what I term a "meter drum" containing ascending and descending registering mechanisms, and carrying the novel multiple die.

As shown in said application and in Figs. 2–6, the meter drum consists of two circular end plates 207 and 208, and an intermediate cylindrical casing 203 which has two glazed sight openings 203ª and 203ᵇ (Fig. 3) through which may be read the figures on the "total" or ascending counter T, and the "balance" or descending counter B. The casing also has an opening closed by a door 204 (Fig. 3) which when closed is locked by means of a catch 205ª engaging a lug 204ᵇ on the door 204. The catch 205ª is attached to the plug 205ᵇ of a Yale lock 205.

A novel multiple postmark die 308 is adjustably mounted in said meter drum as hereinafter described, and at each effective rotation of the meter drum one of the printing faces of said die (Fig. 1) cooperates with an impression roller 103 (Fig. 1) to imprint an envelope.

To the meter drum is secured a gear 215, concentric with shaft 213, which meshes with a gear 115 attached to a stub shaft 114ª, journaled in the plate 105; and to this shaft is attached a handle 114 by which it can be manually turned; so as to cause gears 115 and 215 to turn the drum. When the parts are in proper working condition a postmark stamp will be printed at each effective rotation of the meter drum.

Figure 2:
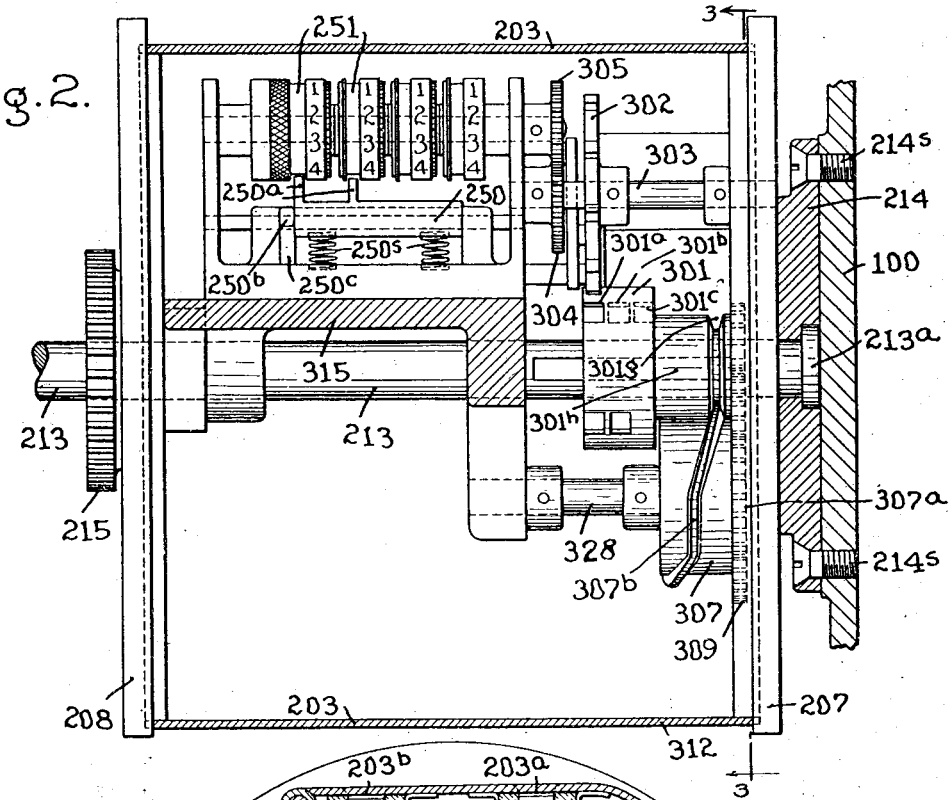
Fig. 2 is a longitudinal detail section through the meter drum showing parts of the register adjusting and locking mechanism.
Figure 3:
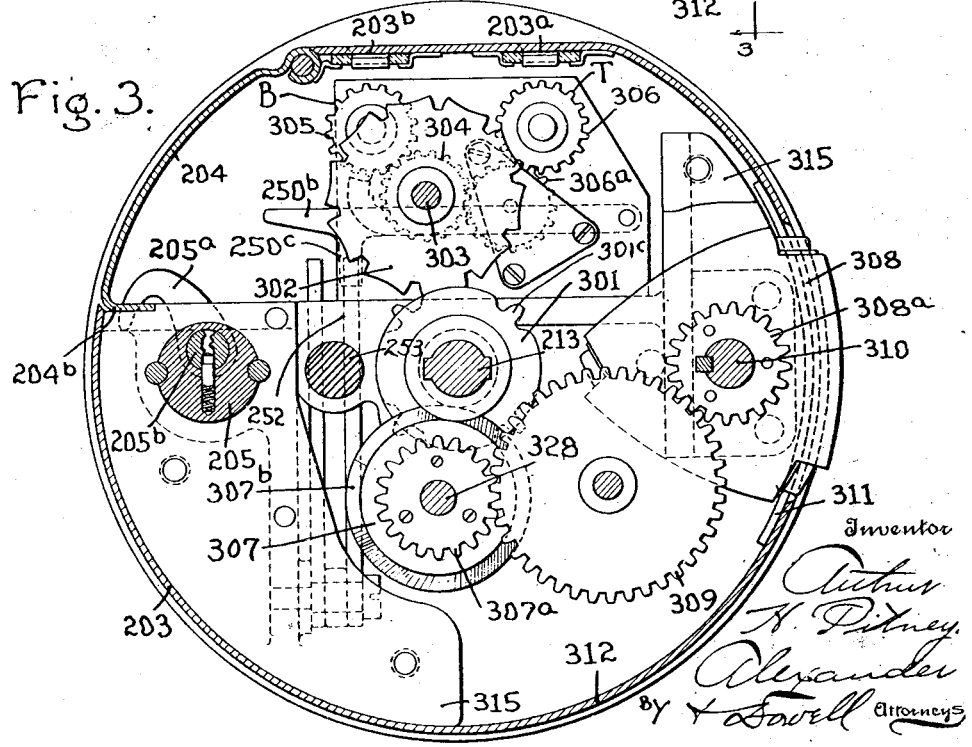
Fig. 3 is a transverse section on the line 3—3, Fig. 2.

Within the meter drum is mounted an ascending counter or total register, indicated at T, and a balance counter or descending register, indicated at B. These registers may be of any suitable type, but are preferably of the type described in my application case filed July 12, 1922, Serial No. 574,427, and case filed December 12, 1922, Serial No. 606,427. Suitable gearing is provided, as indicated in Figs. 2 and 3, whereby for each rotation of the meter drum the units wheels of the registers T and B are respectively operated in accordance with the denomination of the postmark stamp printed; each unit wheel being moved one point for a 1¢ stamp, or two points for a 2¢ stamp, etc., whereby for each rotation of the meter drum the proper extent of motion is imparted to the units wheel gears of the respective registers. The total sum of the postmark stamp impressions made is registered in ascending progression on the total counter or ascending register T; and the amount of each postmark made is subtracted in descending progression on the balance counter or descending register B.

The parts thus far described are substantially constructed and arranged to operate as described in my aforesaid application, Serial No. 647,143, except the multiple die and the means for changing the ratio of the gearing for actuating the registers. In the present invention a multiple changeable or variable die is used in the meter drum and means are provided whereby the registers are actuated in accordance with the denomination of that face of the die which is adjusted to operative or printing position.

The multiple faced die 308 as shown has three printing faces 1, 2, 4 engraved on the three sides of a triangular shaped body 308, each stamp having a different denomination (for 1¢, 2¢ and 4¢). Each die face is approximately rectangular in form and bears all the marks of identification required by the Government.

The die 308 is fast to a spindle 310 rotatably mounted in bearings in a suitable frame or casting 315 secured within the meter drum 300 and in such position that one printing face of the die 308 will be presented in position for printing through an opening in the casing 312 as shown in Figs. 3 and 4.

This spindle 310 may be turned by a screw driver inserted in the notch in the end thereof (see Fig. 6) to adjust the die to desired operative position. The die can be locked when adjusted to operative position by any suitable means. As shown the die body has three openings 308ª in one end equidistant from shaft 310, which openings are adapted to be engaged by sliding bolts 314, which are slidably mounted in the brackets 315 (Figs. 5, 6) and are attached to a member 313 which is slidable on the spindle 310 and attached to a plate 311, which is slidable within the casing 312, and is adjustable by any suitable means.

As shown a screw 311ª passes through a slot 312ª in the casing, and engages a nut 311ᵇ fast to the plate 311. By loosening this bolt the plate 311, member 313, and bolts 314 can be adjusted endwise of the drum so as to project the bolt 314 into engagement with openings 308ª so as to lock the die in any adjusted position or the bolt can be retracted to disengage the die, and permit it to be turned so as to adjust the desired printing surface at the periphery of the drum for use.

When the bolts 314 are retracted to release the die they simultaneously engage sockets 105ª in the hood 105, thereby locking the drum against rotation, while the die is being shifted, and thereby preventing any improper turning of the drum.

The register in the drum must be actuated in accordance with the denomination of that printing surface of the die which is at printing position, and means are provided whereby the adjustment of the die automatically effects adjustment of the variable gearing between the spindle 213 on which the drum is mounted and the registering devices within the drum so that the latter will be operated for each rotation of the drum in exact accordance with the denomination of the stamp to be printed by the die. In the construction shown this mechanism is as follows:

An intermittent gear 301, Figs. 2 and 3, is slidably mounted (but not rotatably) on shaft 213 and has three sets of teeth on its periphery, one set consisting of four equally spaced teeth 301$^a$, the second set having two equally spaced teeth 301$^b$, and the last having only one tooth 301$^c$. A follower gear 302 is pinned to shaft 303 and has ten equally spaced stops cut in its periphery and ten notches adapted to engage with the teeth of the intermittent gear 301. A gear 304 (Figs. 2 and 3) is also pinned to shaft 303 and revolves in unison with the follower gear 302. Gear 304 is directly in mesh with the units spindle gear 305 of the balance counter B, and through an intermediate gear 306$^a$ drives the spindle gear 306 of the total counter T.

A cam 307 is loosely mounted on a spindle 328 and has a peripheral cam 307$^b$ provided with three cam portions and three dwell portions. This cam 307$^b$ is of gear tooth form in cross section and it engages a groove 301$^g$ cut in the periphery of the hub 301$^h$ of the gear 301. When the cam 307 is turned it slides the intermittent gear 301 on shaft 213 into various positions of engagement with the follower gear 302. The cam 307 is rotated to its various positions in accordance with the position of the die 308 by means of a gear 307$^a$ fastened to cam 307 and gearing with an intermediate 309 which is driven by gear 308$^a$ pinned to the spindle 310 to which the die 308 is keyed.

On each face of the die 308 is engraved a postmark stamp of any suitable design, or similar to that shown in Fig. 4, except that the denominations (which may be 1¢, 2¢ or 4¢) differ. When it is desired to change the denomination of the postmark stamp to be printed the screw 311$^a$ Fig. 6, is loosened and plate 311 slid away from the die 308, clearing its path of rotation, and withdrawing bolts 314 (Fig. 5) from the die 308 entering them into holes 105, thereby locking the meter drum against rotation. Spindle 310 is then turned clockwise revolving the die 308 until the desired denomination of stamp appears in printing position. As the die is thus shifted gear 308$^a$ is turned thereby and through the intermediate gear 309, and gear 307$^a$ causes the cam 307 to be revolved clockwise, and this cam in so turning moves the intermittent gear 301 to the left, until the two-tooth section of the gear 301 is alined with the follower gear 302; thereby changing the driving ratio between gear 301 and the follower gear 302 from four to two.

Every time the drum 300 makes one revolution the follower gear 302 is caused to revolve in a planetary motion about the gear 301, and (as in such position of gear 301 only two teeth on gear 301 will engage the follower gear 302) cause gear 302 to be turned two tenths of one revolution; and this motion is transmitted to the counter spindle by gears 304 and 305, and thus the counter units wheel is turned two tenths of one revolution, or two units.

It is obvious that by properly changing the ratio between gear 301 and gear 302 in this manner, any denomination of die may be used, and the exact amount thereof will be accurately registered on the counter at each operation of the machine.

The counter is preferably of the geared type, as described in my aforesaid applications and the method of locking, sealing and recharging the meter has been described in my said patent and application, and needs no further explanation here.

In each working face of the multiple die is a slot 317; and a rod 316 is passed through a hole in the die 308 adjacent each face 1, 2, 4 and intersecting the adjacent slot 317. This rod 316 has a handle 316$^a$ on one end and when the handle is in down position (Figs. 4, 6, 9) the rod protrudes into the slot 317 and the rod may be held in this position by a ball and spring catch indicated at 316$^c$. A flat is milled on one side of the rod and parallel to the handle 316$^a$, and when the hand 1$^e$ is raised 90° this flat registers with the slot 317 and will admit the slug into the slot.

A date and hour slug 318 is removably fitted in slot 317, said slug having a groove cut in its side which aligns with the rod 316 when the slug is in the slot 317. When handle 316 is turned to the down position the rod 316 (Figs. 6 and 8) engages the groove in the slug and prevents it coming out. The permit slug may be placed in a suitable slot in the die and fastened by means of a screw. This however forms no part of the present invention.

The meter drum is limited to rotation in one direction, as described in my said application, by any suitable means, so that it cannot be turned backward and improperly alter the registration of impressions made.

Means are provided, as described in my aforesaid patent and application, whereby when the amount of prepaid postage for which the descending counter has been set is exhausted, the registering mechanism is locked and further effective printing operations are prevented.

In Fig. 2 I have indicated the descending counter which is similar to that shown in prior applications, and comprises a series of numeral wheels 251, each of which is provided with a slot adapted to be engaged by a tooth 250$^a$ on a locking plate 250, which plate is normally pressed toward the wheels by springs 250$^s$. The units wheel of this series is fixed to the shaft or gear 305 so as to be rotated thereby; and the units wheel "carries over" to the tens wheel; the tens "carries over" to the hundreds; and so on, as described in my aforesaid applications.

A handle 250^b (Figs. 2 and 3) is fastened to one side of the locking comb 250, and has a lug 250^c projecting oppositely to the teeth 250^a. Said lug normally projects into the path of a lug on a lever 252 (when the meter is charged or in operative position), which lever is pivoted on a suitable support within the meter drum and engages a slidable locking bolt 253, which is mounted in the meter drum and is adapted to be projected into engagement with a socket in plate 214 and when so engaged will prevent rotation of the meter drum. The bolt 253 is normally held in retracted position by the engagement of the lever 252 with the finger 250^e, all as shown and described in my aforesaid application. But when all the registering wheels 251 in the descending meter B reach "zero" so that all the fingers 250^a in the locking plate 250 can enter the corresponding notches in such registering wheels (as described in my aforesaid applications) the springs 250^s swings the plate 250 toward the registering wheels and thus withdraws the finger 250^e out of the path of the lug 252^a, whereupon the spring actuated lever 252 projects bolt 253 into position to lock the meter drum to the main frame 100 and prevent further rotation of the meter drum until the bolt is retracted.

In Fig. 2 the two teeth of locking comb engaging the units and tens figure wheels of the counter are omitted. Therefore the locking will take place when the dollar wheels show zero, while the balance (in cents as shown by the units and tens wheels) is left standing to be used after the next setting.

When the register B is locked, as above described, the register T will also be locked, because the whole train of gearing is locked, and further rotation of the meter drum is prevented, and when register B is reset ready for further operations, register T will also be ready for further operations.

When the meter drum is thus locked the machine is inoperative and must be taken to the post office to be re-set. When taken to the post office the proper official unlocks the door 204 which he opens with a key retained by the post office department. After opening the meter drum door 204 the official resets the mechanism as described in my aforesaid application.

While I have described the multiple die as having three printing surfaces, obviously the number of such surfaces might be varied according to the desired capacity of the machine. In some cases two surfaces might be sufficient, in others more than three might be required. In any case the number of the sets of teeth on the gear 301 and the number of cams and dwells on the cam 307 should accord with the number and the denominations of the printing dies; i. e. there must be such operative relations between the printing die and registering mechanism that whenever the die is shifted to change its face, the register actuating mechanism will be shifted, so that for each printing operation of any printing surface the register will be actuated in accordance with the denomination of such surface.

Further, while I have explained the invention as used in the meter drum of a machine such as shown in my application Serial No. 647,143, above referred to; the invention is not limited to use with such a machine, nor to use with the particular meter drum referred to, as it is readily adaptable or applicable to other meters and machines; as will be appreciated by those familiar with the art.

The adaptability and utility of the invention for other purposes in the art than merely printing postage, will be obvious to those familiar with the invention, and I consider all such applications within the scope of the invention as covered in the claims.

I do not herein claim the particular construction of the die, or the particular means for locking same in adjusted position, apart from the registering mechanism. That will form the subject matter of a divisional companion application Serial No. 659,237, filed August 24, 1923.

What I claim is:

1. In mechanism of the character specified having a rotatable drum, a multi-faced die rotatably mounted therein and means for adjusting the die to enable any printing surface of the die to be brought to printing position at the periphery of the drum; a register in the drum; and means for rotating the drum to take an impression from the printing surface at the periphery of the drum; a master wheel for operating the register; a multiple gear adapted to operate the master gear, said multiple gear having sets of teeth respectively corresponding in number to the denominations of the respective printing surfaces of the die, and a cam member operated by the shifting of the die whereby the multiple gear is shifted when the die is shifted thereby causing the register to be operated in accordance with the denomination of the adjusted die.

2. In mechanism of the character specified having a rotatable drum, and a die mounted in the drum having a plurality of curved segments on its periphery, each bearing a stamp printing surface, said die being rotatorially adjustable on its axis to bring any one of the segmental printing surfaces to operative position; a register mounted in the drum adjacent the die, means for rotating the drum to take impressions from the die, and means whereby the adjustment of the die will cause the register to be operated in accordance with the denomination of the adjusted die.

3. In mechanism of the character specified having a die provided with a plurality of printing surfaces and rotatable on its own axis to bring any printing surface thereon to printing position; and means for moving the die bodily through an orbit at each printing operation; a register, a master wheel for operating the register; a multiple gear adapted to operate the master gear, said multiple gear having sets of teeth respectively corresponding in number to the denominations of the respective printing surfaces of the die; and means whereby when the die is shifted to change the denomination of the die from which impression is taken, the multiple gear is also shifted to bring the proper set of teeth into proper engagement with the master gear to actuate the register in accordance with the denomination of the adjusted die.

4. In mechanism of the character specified having a die provided with a plurality of printing surfaces and rotatable on its own axis to bring any printing surface thereon to printing position; and means for moving the die through an orbit at each printing operation; a register movable through the orbit with the die; a master wheel for operating the register; a multiple gear adapted to operate the master gear, said multiple gear having sets of teeth respectively corresponding in number to the denominations of the respective printing surfaces of the die; and means whereby the shifting of the die will cause the multiple gear to be shifted to bring the proper set of teeth into proper engagement with the master gear, whereby the register is actuated in accordance with the denomination of the adjusted die.

5. In a machine of the character specified, having a rotatable meter drum, a die mounted in said drum having a plurality of circumferentially arranged printing surfaces and adjustable on its own axis to bring any of its segments to printing position, and means for rotating the drum; a single register in the drum, variable gearing, and means whereby the adjustment of the die causes the said register to be operated in accordance with the denomination printed by the adjusted die.

6. In a machine of the character specified having a rotatable meter drum; a die mounted in said drum having a plurality of circumferentially arranged printing surfaces and rotatorially adjustable on its own axis to bring any of said surfaces to printing position; and means for rotating the drum to taken an impression from the surface in printing position; a register in the drum, variable gearing for operating the register upon the rotation of the drum, and means whereby the adjustment of the dies causes the gearing to be varied so that the register will be operated in accordance with the denomination of the adjusted die.

In testimony that I claim the foregoing as my own, I affix my signature.

ARTHUR H. PITNEY.